US012763390B2

(12) United States Patent
Yu et al.

(10) Patent No.: US 12,763,390 B2
(45) Date of Patent: Oct. 13, 2026

(54) METHOD FOR RECOVERING ALUMINUM RESIDUE WITH CONTROLLED PARTICLE SIZE, AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yingsheng Zhong, Foshan (CN); Yinghao Xie, Foshan (CN); Changdong Li, Foshan (CN); Xuemei Zhang, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP RECYCLING CO., LTD., Changsha (CN)

( * ) Notice: Subject to any disclaimer, the term of this patent is extended or adjusted under 35 U.S.C. 154(b) by 513 days.

(21) Appl. No.: 18/373,950

(22) Filed: Sep. 27, 2023

(65) Prior Publication Data

US 2024/0021902 A1 Jan. 18, 2024

Related U.S. Application Data

(63) Continuation of application No. PCT/CN2021/142524, filed on Dec. 29, 2021.

(30) Foreign Application Priority Data

Apr. 7, 2021 (CN) ........................ 202110373899.1

(51) Int. Cl.
*H01M 10/54* (2006.01)
*C22B 1/02* (2006.01)
(Continued)

(52) U.S. Cl.
CPC ............... *H01M 10/54* (2013.01); *C22B 1/02* (2013.01); *C22B 1/24* (2013.01); *C22B 7/008* (2013.01); *C22B 21/0023* (2013.01)

(58) Field of Classification Search
None
See application file for complete search history.

(56) References Cited

U.S. PATENT DOCUMENTS

| | | | | |
|---|---|---|---|---|
| 6,524,737 B1 * | 2/2003 | Tanii | H01M 10/54 | |
| | | | 429/49 | |
| 2004/0028585 A1 * | 2/2004 | Cardarelli | H01M 10/54 | |
| | | | 423/66 | |
| 2023/0115052 A1 * | 4/2023 | Bobbili | B09B 3/40 | |
| | | | 423/179.5 | |

FOREIGN PATENT DOCUMENTS

| | | | |
|---|---|---|---|
| CN | 105671316 * | 6/2016 | C22B 15/00 |
| CN | 105671316 A | 6/2016 | |

(Continued)

OTHER PUBLICATIONS

English translation of CN119349529 (Year: 2025).*

(Continued)

*Primary Examiner* — Yoshitoshi Takeuchi
(74) *Attorney, Agent, or Firm* — Westbridge IP LLC

(57) ABSTRACT

The present disclosure belongs to the technical field of battery recycling, and discloses a method for recovering an aluminum residue with a controlled particle size, and use thereof. The method includes the following steps: crushing and sieving a positive electrode sheet of a waste power battery, then, crushing at −198° C. to −196° C. with addition of liquid nitrogen to obtain a granular material; roasting, (Continued)

cooling, and grinding the granular material, adding water, shaking, settling into layers, and separating the layers to obtain a positive electrode active powder layer, a transition layer, and an aluminum residue particle layer; and shaking the aluminum residue particle layer and the transition layer for a second time, settling into layers, and collecting aluminum residue particles and a positive electrode active powder.

6 Claims, 2 Drawing Sheets

(51) Int. Cl.
*C22B 1/24* (2006.01)
*C22B 7/00* (2006.01)
*C22B 21/00* (2006.01)

(56) References Cited

FOREIGN PATENT DOCUMENTS

| | | | | |
|---|---|---|---|---|
| CN | 108933307 | * | 12/2018 | H01M 10/052 |
| CN | 108933307 A | | 12/2018 | |
| CN | 110289456 | * | 9/2019 | H01M 10/052 |
| CN | 110289456 A | | 9/2019 | |
| CN | 111029677 A | * | 4/2020 | H01M 10/54 |
| CN | 112234272 | * | 1/2021 | C01B 25/37 |
| CN | 112234272 A | | 1/2021 | |
| CN | 119349529 A | * | 1/2025 | H01M 10/052 |
| CN | 119528185 A | * | 2/2025 | H01M 10/54 |

OTHER PUBLICATIONS

English translation of CN119528185 (Year: 2025).*
English translation of CN111029677 (Year: 2019).*
International Search Report of PCT Patent Application No. PCT/CN2021/142524 issued on Mar. 22, 2022.

* cited by examiner

METHOD FOR RECOVERING ALUMINUM RESIDUE WITH CONTROLLED PARTICLE SIZE, AND USE THEREOF

CROSS-REFERENCE TO RELATED APPLICATIONS

The present application is a continuation application of PCT application No. PCT/CN2021/142524 filed on Dec. 29, 2021, which claims the benefit of Chinese Patent Application No. 202110373899.1 filed on Apr. 7, 2021. The contents of all of the aforementioned applications are incorporated by reference herein in their entirety.

TECHNICAL FIELD

The present disclosure belongs to the technical field of battery recycling, and specifically relates to a method for recovering an aluminum residue with a controlled particle size, and use thereof.

BACKGROUND

Battery positive electrode sheet scraps include aluminum-based current collectors, active substances such as lithium iron phosphate (LFP, $LiFePO_4$) and lithium nickel manganese cobalt oxide (LNMCO, $LiNi_xCo_yMn_{1-x-y}O_2$, where x+y=1, 0<x<1, 0<y<1), binders, conductive additives, etc., where Ni, Mn, Co, Li, Al, etc. are metals with potential recycling value.

Currently, the recycling of battery positive electrode sheet scraps mainly includes: subjecting the positive electrode sheet scraps to a series of treatments such as coarse crushing, physical sieving, and fine crushing to obtain a granular material of the positive electrode sheet scraps; and subjecting the granular material to acid extraction, alkali extraction, and valuable metal recovery. However, the positive electrode sheet scrap particles include a small amount of aluminum residue particles and other impurity particles that have a small particle size, and the mixing of the impurity particles with active substance and binder particles of positive electrode sheet scraps leads to high recycling difficulty. Therefore, a recovery rate of aluminum residue particles in positive electrode sheet scrap particles should be increased as much as possible to reduce the generation of flammable and explosive hydrogen from aluminum in a subsequent recovery process of valuable metals and improve the purity of recovered metals such as Ni, Co, and Li and the safety during extraction.

SUMMARY

The present disclosure is intended to solve at least one of the technical problems existing in the prior art. In view of this, the present disclosure provides a method for recovering an aluminum residue with a controlled particle size, and use thereof. In the present disclosure, when fine crushing is conducted at a low temperature, the binding performance of a binder is significantly reduced, and positive electrode active substances and the binder are in a brittle state and are easily broken, but an aluminum residue still has some toughness. Different embrittlement temperatures of different materials allow selective crushing at a low temperature. Positive electrode active particles, binder particles, and aluminum residue particles obtained after crushing each have a narrow particle size range, which improves a recovery rate of the aluminum residue in the positive electrode sheet scrape particles and the safety during a recovery process of metals from a positive electrode scrape powder.

To achieve the above objective, the present disclosure adopts the following technical solutions:

The present disclosure provides a method for recovering an aluminum residue with a controlled particle size, including the following steps:

- step 1, recovering, crushing, and sieving a positive electrode sheet of a waste power battery, then, crushing at −198° C. to −196° C. with addition of liquid nitrogen to obtain a granular material;
- step 2, roasting the granular material, and collecting a gaseous binder produced from the roasting with an alkaline solution; and cooling and grinding a residue to obtain a waste positive electrode sheet powder;
- step 3, adding water to the waste positive electrode sheet powder, shaking, settling into layers, and separating the layers to obtain a positive electrode active powder layer, a transition layer, and an aluminum residue particle layer; and
- step 4, shaking the aluminum residue particle layer and the transition layer for a second time, settling into layers, and collecting aluminum residue particles and a positive electrode active powder.

Preferably, in step 1, the granular material may have a particle size of 0.01 μm to 500 μm.

Preferably, in step 1, the liquid nitrogen may be added at an amount of 5% to 30% of a mass of the positive electrode sheet of the waste power battery.

Preferably, in step 2, the roasting may be conducted in an inert gas atmosphere; and further preferably, an inert gas of the inert gas atmosphere may be one from the group consisting of He, Ne, and Ar.

Preferably, in step 2, the roasting may be conducted at 350° C. to 500° C. for 30 min to 60 min.

Preferably, in step 2, a heating rate for the roasting may be controlled at 10° C./min to 20° C./min; and further preferably, the heating rate for the roasting may be controlled at 10° C./min to 15° C./min.

Preferably, in step 2, the alkaline solution may be at least one from the group consisting of $Mg(OH)_2$, NaOH, and $Ca(OH)_2$.

Preferably, in step 2, the gaseous binder may be polyvinylidene fluoride (PVDF) or polytetrafluoroethylene (PTFE).

Preferably, in step 2, a grinder used in the grinding may have a treatment capacity of <100 kg/h and a rotational speed of 120 rpm to 180 rpm.

Preferably, in steps 3 and 4, a shaker used in the shaking may have a shaking frequency of 5 Hz to 20 Hz and a shaking amplitude of 0.5 cm to 2 cm, and the shaking may be conducted for 5 min to 10 min.

Preferably, in steps 3 and 4, during shaking, the waste positive electrode sheet powder may be kept immersed in water in a container.

Preferably, in steps 3 and 4, the water may be deionized water.

Preferably, steps 3 and 4 may be repeated 1 to 10 times until the aluminum residue particles and the positive electrode active powder in the particles are completely separated and collected.

The present disclosure also provides use of the method described above in valuable metal recovery.

Principle of the Present Disclosure

In the present disclosure, aluminum residue particle impurities in a waste positive electrode sheet granular material still have some ductility and toughness at a low temperature (−196° C.) or a high temperature (350° C. to 500° C.), while positive electrode active substances in waste positive electrode particles become loose and have very low adhesion after being treated at a low temperature or a high temperature. Positive electrode active substance particles, binder particles, and aluminum residue particles obtained after fine crushing at a low temperature each have a narrow particle size range, which creates conditions for subsequent separation and recovery. During a heating process, the binder is volatilized in gaseous form and recovered, and a residue is then cooled and ground by a grinder under an appropriate pressure, where positive electrode active particles are easily ground into a positive electrode active powder with a smaller particle size, but the particle size of most aluminum residue particles remains unchanged. The Brazil nut effect is utilized: During a shaking process, small particles gradually seep through gaps among large particles to a lower part, such that the small particles are easy to fill in a lower layer below the large particles and the large particles accumulate in an upper layer. When the positive electrode active powder and aluminum residue particles with different particle sizes in the container are shaken at a specified shaking frequency, aluminum residue particles with a large particle size float in a surface layer, and the positive electrode sheet active powder sinks to a bottom layer; and then waste positive electrode sheet granular materials in the middle and upper layers are collected and shaken for the second time to separate and collect the aluminum residue and the positive electrode active powder, thereby effectively separating and collecting the positive electrode active powder and the coarse-grained aluminum residue in the waste positive electrode sheet granular material.

Compared with the prior art, the present disclosure has the following beneficial effects.

1. In the present disclosure, when fine crushing is conducted at a low temperature, the binding performance of a binder is significantly reduced, and positive electrode active substances and the binder are in a brittle state and are easily broken, but an aluminum residue still has some toughness. Different embrittlement temperatures of different materials allow selective crushing at a low temperature. Positive electrode active particles, binder particles, and aluminum residue particles obtained after crushing each have a narrow particle size range, which creates conditions for subsequent separation and recovery.

2. During the high-temperature roasting process of the present disclosure, the gaseous binder generated is adsorbed by the alkaline solution, which can not only achieve the recycling of the binder, but also immediately remove the binder in the waste positive electrode sheet particles to avoid interference of the binder for subsequent recovery processes.

3. In the present disclosure, after the high-temperature roasting, the positive electrode active particles are easily ground into a positive electrode active powder, and the particle size of most aluminum residue particles remains unchanged; and then the Brazil nut effect is used to accurately separate and recover an aluminum residue particle layer and a positive electrode active powder layer through two times of shaking and stratification, which avoids the sieving with a mesh screen and the inclusion of aluminum residue particles in a positive electrode active powder obtained after sieving, thereby improving the separation and recovery efficiency.

4. In the present disclosure, in the first shaking and the second shaking, deionized water is added in the container mainly for the following reasons: The water has a specified buoyant force, which can partially compensate the gravity of the positive electrode active powder and the aluminum residue particles, thereby accelerating the seepage flow between the two particles. The addition of the water can avoid the generation of dust in the container during the shaking, such that there will be no adverse consequences such as dust diffusion and dust explosion.

5. In the present disclosure, the shaking frequency, shaking amplitude, and shaking time of a shaker used in the first shaking and the second shaking, and the volume of a filled material in the container and the volume of added deionized water in the first shaking can be set as fixed values, such that a thickness of a contact layer between the aluminum residue particle layer and the positive electrode active powder layer in the container after the first shaking and a thickness of a critical layer between the aluminum residue particle layer and the positive electrode active powder layer after the second shaking are all fixed values, which avoids the re-determination of a layer thickness when steps 4 to 5 are repeated.

DETAILED DESCRIPTION

Figure 1:
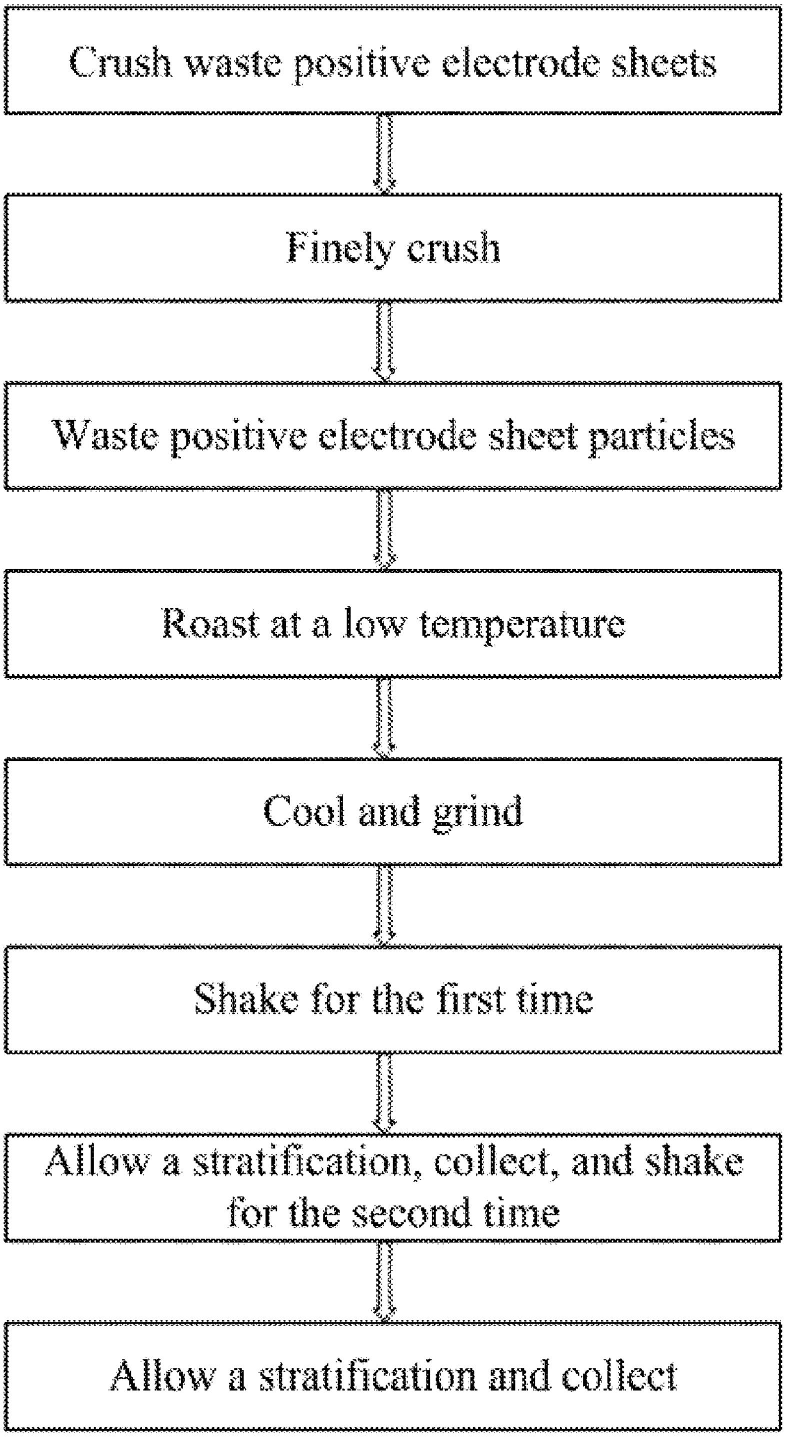
FIG. 1 is a flowchart of the method for recovering an aluminum residue with a controlled particle size according to an example of the present disclosure.

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

A method for recovering an aluminum residue with a controlled particle size was provided, including the following specific steps:

step 1, preparation of waste positive electrode sheet particles: a waste positive electrode sheet produced in a power battery production process was recovered, and then coarsely crushed mechanically and sieved; and 9% liquid nitrogen was added, and then fine crushing was conducted to obtain waste positive electrode sheet particles with impurities, which had a particle size of 0.01 μm to 500 μm;

step 2, roasting: 113 kg of the waste positive electrode sheet particles was placed in an electric resistance furnace; the electric resistance furnace was filled with He, a temperature of the electric resistance furnace was increased and controlled at 360° C., and the roasting was stably conducted for 55 min, where a heating rate for the electric resistance furnace was controlled at 15° C./min; and a gas produced during the roasting was collected through a $Ca(OH)_2$ alkaline solution;

step 3, cooling and grinding: on the basis of step 2, the waste positive electrode sheet particles in the electric resistance furnace were cooled to room temperature, and then cooled waste positive electrode sheet particles were ground on a disc grinder for about 1.5 h to obtain a waste positive electrode sheet powder, where the grinder had a discharge amount of about 80 kg/h and a rotational speed of 160 rpm;

step 4, first shaking: on the basis of step 3, 30 kg of the waste positive electrode sheet powder was transferred into a stainless steel cuboid container, and deionized water was added to just immerse the waste positive electrode sheet powder in the container; and the cuboid container was fixed on a horizontal shaker and shaken for 6 min to obtain a positive electrode active powder layer, a transition layer, and an aluminum residue particle layer, where the horizontal shaker had a shaking frequency of 8 Hz and a shaking amplitude of 1.0 cm;

step 5, second shaking: on the basis of step 4, the positive electrode active powder layer in the container was transferred into another container, and the aluminum residue particle layer and the transition layer were collected and transferred to a clean stainless steel cuboid container, and shaken for 6 min to obtain an aluminum residue particle layer and a positive electrode active powder layer, where a shaker had a shaking frequency of 8 Hz and a shaking amplitude of 1.0 cm, and during shaking, the waste positive electrode sheet powder was kept immersed in deionized water in the container;

step 6, steps 4 and 5 were repeated 3 times such that the aluminum residue particles and the positive electrode active powder in 118 kg of the waste positive electrode sheet particles were completely recovered.

Example 2

A method for recovering an aluminum residue with a controlled particle size was provided, including the following specific steps:

step 1, preparation of waste positive electrode sheet particles: a waste positive electrode sheet produced in a power battery production process was recovered, and then coarsely crushed mechanically and sieved; and 15% liquid nitrogen was added, and then fine crushing was conducted to obtain a granular material with a particle size of 0.01 μm to 500 μm;

step 2, roasting: 261 kg of the granular material was placed in an electric resistance furnace; the electric resistance furnace was filled with He, a temperature of the electric resistance furnace was increased and controlled at 420° C., and the roasting was stably conducted for 40 min, where a heating rate for the electric resistance furnace was controlled at 15° C./min; and a gas produced during the roasting was collected through a $Ca(OH)_2$ alkaline solution;

step 3, cooling and grinding: on the basis of step 2, the waste positive electrode sheet particles in the electric resistance furnace were cooled to room temperature, and then cooled waste positive electrode sheet particles were ground on a disc grinder for about 1.5 h to obtain a waste positive electrode sheet powder, where the grinder had a discharge amount of about 80 kg/h and a rotational speed of 160 rpm;

step 4, first shaking: on the basis of step 3, 30 kg of the waste positive electrode sheet powder was transferred into a stainless steel cuboid container, and deionized water was added to just immerse the waste positive electrode sheet powder in the container; and the cuboid container was fixed on a horizontal shaker and shaken for 6 min to obtain a positive electrode active powder layer, a transition layer, and an aluminum residue particle layer, where the horizontal shaker had a shaking frequency of 8 Hz and a shaking amplitude of 1.0 cm;

step 5, second shaking: on the basis of step 4, the positive electrode active powder layer in the container was transferred into another container, and the aluminum residue particle layer and the transition layer were collected and transferred to a clean stainless steel cuboid container, and shaken for 6 min to obtain an aluminum residue particle layer and a positive electrode active powder layer, where a shaker had a shaking frequency of 8 Hz and a shaking amplitude of 1.0 cm, and during shaking, the waste positive electrode sheet particles were kept immersed in deionized water in the container;

step 6, steps 4 and 5 were repeated 3 times such that the aluminum residue particles and the positive electrode active powder in 118 kg of the waste positive electrode sheet particles were completely recovered.

Example 3

A method for recovering an aluminum residue with a controlled particle size was provided, including the following specific steps:

step 1, preparation of waste positive electrode sheet particles: a waste positive electrode sheet produced in a power battery production process was recovered, and then coarsely crushed mechanically and sieved; and 22% liquid nitrogen was added, and then fine crushing was conducted to obtain a granular material with a particle size of 0.01 μm to 500 μm;

step 2, roasting: 387 kg of the granular material was placed in an electric resistance furnace; the electric resistance furnace was filled with He, a temperature of the electric resistance furnace was increased and controlled at 460° C., and the roasting was stably conducted for 35 min, where a heating rate for the electric resistance furnace was controlled at 18° C./min; and a gas produced during the roasting was collected through a $Mg(OH)_2$ alkaline solution;

step 3, cooling and grinding: on the basis of step 2, the waste positive electrode sheet particles in the electric resistance furnace were cooled to room temperature, and then cooled waste positive electrode sheet particles were ground on a disc grinder for about 4.8 h to obtain a waste positive electrode sheet powder, where the grinder had a treatment capacity of about 80 kg/h and a rotational speed of 120 rpm;

step 4, first shaking: about 80 kg of the waste positive electrode sheet powder was transferred into a stainless steel cuboid container, and deionized water was added to just immerse the waste positive electrode sheet powder in the container; and the cuboid container was fixed on a horizontal shaker and shaken for 10 min to obtain a positive electrode active powder layer, a transition layer, and an aluminum residue particle layer, where the horizontal shaker had a shaking frequency of 15 Hz and a shaking amplitude of 0.5 cm;

step 5, second shaking: on the basis of step 4, the positive electrode active powder layer in the container was transferred into another container, and the aluminum residue particle layer and the transition layer were collected and transferred to a clean stainless steel cuboid container, and shaken for 10 min to obtain an aluminum residue particle layer and a positive electrode active powder layer, where a shaker had a shaking frequency of 15 Hz and a shaking amplitude of 0.5 cm, and during shaking, the waste positive electrode sheet particles were kept immersed in deionized water in the container;

step 6, steps 4 and 5 were repeated 4 times such that the aluminum residue particles and the positive electrode active powder in 387 kg of the waste positive electrode sheet particles were completely recovered.

Comparative Example 1

A method for recovering an aluminum residue was provided, including the following specific steps:

This comparative example was different from Example 1 in that the shaking in steps 4 and 5 was not conducted, and the waste positive electrode sheet particles were directly ground and sieved to obtain a positive electrode active powder and aluminum residue particles.

Comparative Example 2

A method for recovering an aluminum residue with a controlled particle size was provided, including the following specific steps:

This comparative example was different from Example 1 in that, in step 1, the operation of adding liquid nitrogen to conduct fine crushing was not conducted.

Comparative analysis of Examples 1, 2, and 3 with the comparative examples:

Table 1 shows the mass percentages of aluminum residue in the positive electrode active powders recovered in Examples 1, 2, and 3 and Comparative Examples 1 and 2 and the aluminum residue particle size distribution percentages in 0 μm to 10 μm, 10 μm to 50 μm, 50 μm to 100 μm, and 100 μm to 500 μm. In Comparative Examples 1 and 2, liquid nitrogen and shaking treatments were not adopted, and only sieving was conducted with a conventional mesh screen to obtain a positive electrode active powder and aluminum residue particles. Mass percentage of aluminum residue in positive electrode active powder=mass of aluminum residue in a recovered positive electrode active powder/mass of the recovered positive electrode active powder*100%. Aluminum in the positive electrode active powder was determined by flame atomic absorption spectrometry (FAAS), and a particle size of the aluminum residue was determined with a laser particle size analyzer.

It can be seen from Table 1 that, compared with that in Comparative Examples 1 and 2, the positive electrode active powders prepared in Examples 1, 2, and 3 had extremely-small aluminum residue mass percentages (0.55%, 0.71%, and 0.42%, respectively), indirectly proving that a recovery rate of aluminum residue after the shaking was very high; in Examples 1, 2, and 3, the aluminum residue particle size distribution percentages in 0 μm to 50 μm were only of 7.86%, 6.31%, and 9.43%, respectively, but in Comparative Examples 1 and 2, the aluminum residue particle size distribution percentages in 0 μm to 50 μm were up to 13.53% and 19.75%, respectively; in Examples 1, 2, and 3, the aluminum residue particle size distribution percentages in 100 μm to 500 μm were of 73.88%, 76.82%, and 73.89% respectively (the largest), which were 23.52%, 26.46%, and 23.53% higher than the average aluminum residue particle size distribution percentages of Comparative Examples 1 and 2 in 100 μm to 500 μm, respectively; and compared with the comparative examples, in Examples 1, 2, and 3, the aluminum residue particle size distribution percentages in 100 μm to 500 μm were higher, indicating that the particle size of an aluminum residue was effectively controlled to improve the recovery efficiency of an aluminum residue.

TABLE 1

Aluminum residue mass percentages in the positive electrode active powders and aluminum residue particle size distribution percentages in different ranges

| Treatment group | Aluminum residue mass percentage in positive electrode active powder (%) | Aluminum residue particle size distribution percentages in different ranges (%) 0 μm to 10 μm | 10 μm to 50 μm | 50 μm to 100 μm | 100 μm to 500 μm |
|---|---|---|---|---|---|
| Example 1 | 0.55 | 0.14 | 7.72 | 18.26 | 73.88 |
| Example 2 | 0.71 | 0.07 | 6.24 | 16.87 | 76.82 |
| Example 3 | 0.42 | 0.06 | 9.37 | 16.68 | 73.89 |
| K1 | 13.87 | 0.19 | 13.34 | 27.36 | 59.11 |
| K2 | 17.55 | 0.74 | 19.01 | 38.64 | 41.61 |

Figure 2:
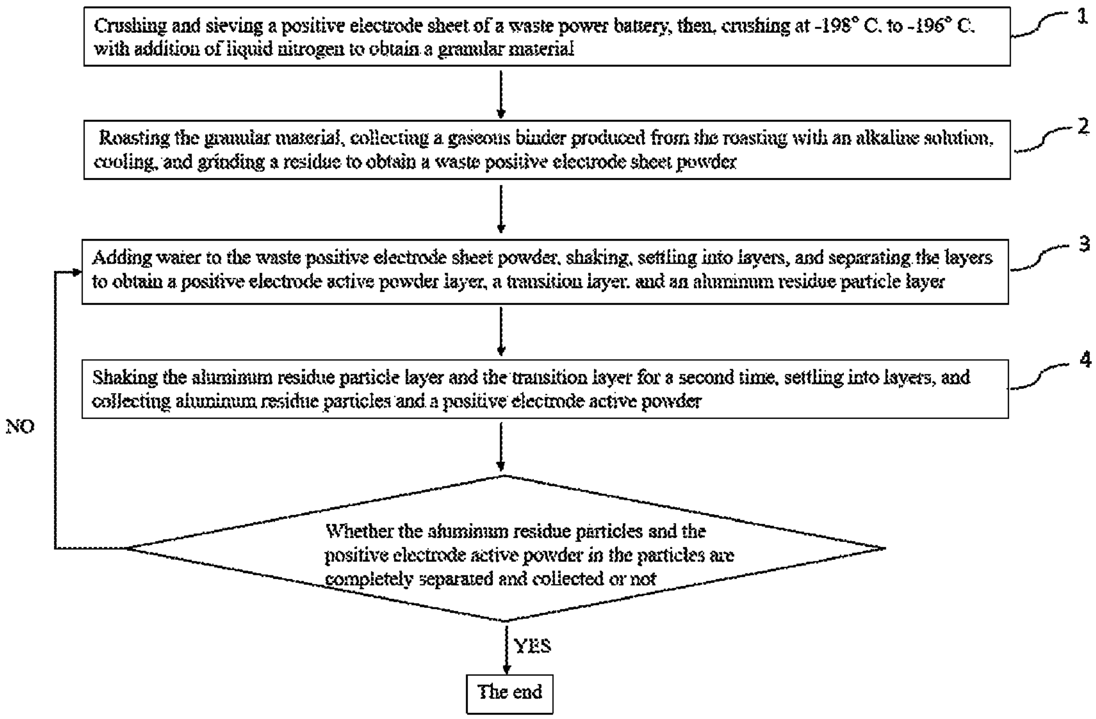
FIG. 2 is a flowchart of the method for recovering an aluminum residue with a controlled particle size according to another example of the present disclosure.

FIG. 1 and FIG. 2 are flowcharts of the method for recovering an aluminum residue with a controlled particle size according to an example of the present disclosure, and it can be seen from FIG. 1 and FIG. 2 that, in the preparation of waste positive electrode sheet particles from a waste positive electrode sheet, liquid nitrogen is added to conduct fine crushing; and then the waste positive electrode sheet particles are subjected to roasting, grinding, two times of shaking for stratification to obtain an aluminum residue and a positive electrode active powder.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A method for recovering an aluminum residue with a controlled particle size, comprising the following steps:

step 1, crushing and sieving a positive electrode sheet of a waste power battery, then, crushing at −198° C. to −196° C. with addition of liquid nitrogen to obtain a granular material;

step 2, roasting the granular material, collecting a gaseous binder produced from the roasting with an alkaline solution, cooling, and grinding a residue to obtain a waste positive electrode sheet powder;

step 3, adding water to the waste positive electrode sheet powder, shaking, settling into layers, and separating the layers to obtain a positive electrode active powder layer, a transition layer, and an aluminum residue particle layer; and step 4, shaking the aluminum residue particle layer and the transition layer for a second time, settling into layers, and collecting aluminum residue particles and a positive electrode active powder, in step 1, the granular material has a particle size of 0.01 μm to 500 μm;

in step 2, the gaseous binder is polyvinylidene fluoride (PVDF) or polytetrafluoroethylene (PTFE);

in step 2, a grinder used in the grinding has a treatment capacity of <100 kg/h and a rotational speed of 120 rpm to 180 rpm;

in steps 3 and 4, during shaking, the waste positive electrode sheet powder are kept immersed in water in a container; and the water is deionized water;

steps 3 and 4 are repeated 1 to 10 times until the aluminum residue particles and the positive electrode active powder in the particles are completely separated and collected.

2. The method according to claim 1, wherein in step 1, the liquid nitrogen is added at an amount of 5% to 30% of a mass of the positive electrode sheet of the waste power battery.

3. The method according to claim 1, wherein in step 2, the roasting is conducted in an inert gas atmosphere; and an inert gas of the inert gas atmosphere is one from the group consisting of He, Ne, and Ar.

4. The method according to claim 1, wherein in step 2, the roasting is conducted at 350° C. to 500° C. for 30 min to 60 min.

5. The method according to claim 1, wherein the alkaline solution is at least one from the group consisting of $Mg(OH)_2$, NaOH, and $Ca(OH)_2$.

6. The method according to claim 1, wherein in steps 3 and 4, a shaker used in the shaking has a shaking frequency of 5 Hz to 20 Hz and a shaking amplitude of 0.5 cm to 2 cm, and the shaking is conducted for 5 min to 10 min.

* * * * *